United States Patent [19]

Linder

[11] 4,225,904
[45] Sep. 30, 1980

[54] FOG FILTER FOR HEADLIGHTS

[76] Inventor: Bill Linder, 822 Zola, Houston, Tex. 77076

[21] Appl. No.: 907,129

[22] Filed: May 18, 1978

[51] Int. Cl.$^2$ .......................... B60Q 1/00; F21M 3/14; F21V 21/00; G02B 7/00
[52] U.S. Cl. ...................................... 362/61; 350/318; 362/214; 362/398
[58] Field of Search ................. 362/255, 398, 61, 433, 362/434, 455, 214, 215; 350/317, 318, 276 R, DIG. 3

[56] References Cited

U.S. PATENT DOCUMENTS

| | | | |
|---|---|---|---|
| 2,499,555 | 3/1950 | Wronkowski | 362/455 |
| 2,550,594 | 4/1951 | Petrakakis | 362/61 |
| 2,807,711 | 9/1957 | McDonald | 362/61 |
| 3,191,025 | 6/1965 | Harker | 350/318 |
| 3,334,220 | 8/1967 | Komiske | 350/318 |
| 3,350,557 | 10/1967 | Szymanski | 350/318 |
| 3,593,021 | 7/1971 | Auerbach | 362/434 |
| 3,696,238 | 10/1972 | Szymanski | 350/318 |
| 4,006,377 | 2/1977 | Kosmatka | 350/318 |

Primary Examiner—Donald P. Walsh
Attorney, Agent, or Firm—Neal J. Mosely

[57] ABSTRACT

A fog filter for automobile headlights consists of a lens cover in the form of a sheet of smooth transparent plastic material, preferably of an amber color, and which has a circular outline and a diameter corresponding to that of the standard sealed beam automobile lens. The lens cover is secured at its periphery to a rim portion having formed integrally therewith a continuous magnet which cooperates with the metal rim of the automobile headlight to secure the filter or lens cover in place. Two types of lens covers or filters are disclosed. One is a complete filter or lens cover for the two high-beam lenses of a double headlight system wherein the filter of lens cover is amber or other suitable color. The other form of filter or lens cover is for single headlights having both the high-beam and low-beam in the same lamp wherein the filter or lens cover is clear in the lower half thereof and amber colored or the like in the upper half. Both forms of filter or lens cover have a continuous magnet extending around the entire periphery thereof to secure the same in place by magnet attraction to the metal rim surrounding the headlight.

6 Claims, 4 Drawing Figures

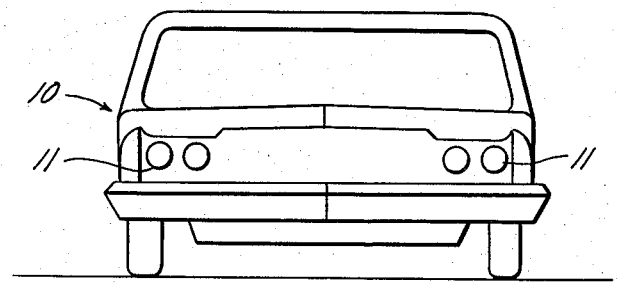
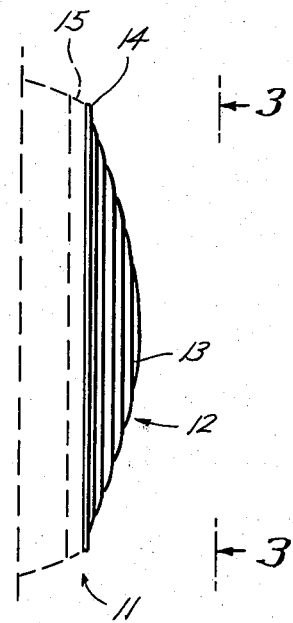
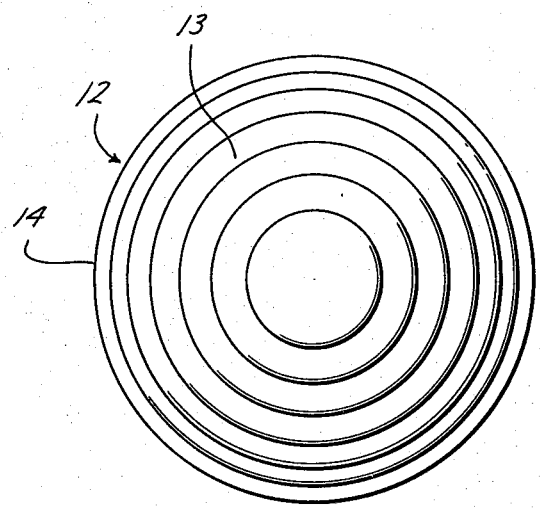
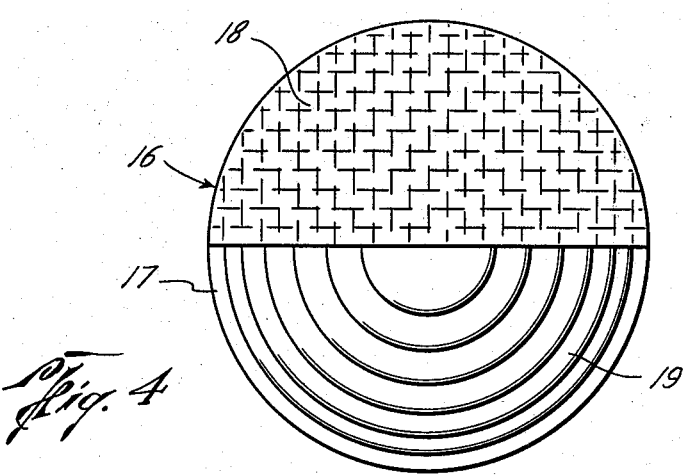

FOG FILTER FOR HEADLIGHTS

BACKGROUND OF THE INVENTION

1. Field of the Invention

This invention relates to lens covers or filters for use with headlights of automobiles wherein the filter or lens cover may be removably positioned on the highlights for use only during conditions of rain or fog.

2. Brief Description of the Prior Art

It has been common practice for many years to use a special fog lamp having colored lenses on automobiles for improved visibility in fog and rain. It has been known for many years that visibility under conditions where the light admitted by automobile headlights is diffused and reflected in the atmosphere directly in front of the vehicle, as by fog or rain, can be improved by altering the color of the light and decreasing its intensity somewhat. It has been known for a long time that amber or yellow light is particularly advantageous from the standpoint that it permits greater intensity before reflection and diffusion of light become unduly troublesome than is possible when white light or light of other colors is used.

Modern motor vehicles are provided with sealed beam headlights of a shape and size which has been standardized over a period of years. Most modern vehicles have twin headlights on each side wherein one of the lights is a high-beam and the other a low-beam. Somewhat older vehicles may be provided with sealed beam headlights of standardized size and shape wherein the light has two alternately usuable filaments arranged to provide a low beam of light or a high beam of light according to which filament is used. Both beams of light are of relatively high intensity and the lenses of such headlights and the lenses of twin beam headlights are not colored, since for driving in clear weather the reduced intensity of light caused by coloring the lens results in too great a loss of illumination.

Automobiles are commonly provided with parking lights of very low intensity but these cannot be used in fog and rain since the amount of light provided is too little. To overcome these difficulties, it has been quite common to equip vehicles with auxiliary fog lights having colored lenses. Such lights are expensive and troublesome to install. If fog lights are supported on the front bumper they are subject to being damaged or becoming maladjusted from contact with other surfaces, e.g. bumpers of other cars, a wall of a garage, etc.

The Lightfoot U.S. Pat. No. 1,129,106 discloses the use of a small colored light filter removably positioned over the central portion of an automobile headlight.

Ellis U.S. Pat. No. 1,364,189 discloses flood lights having a lens consisting of a lamination of clear glass and colored glass held together removably by a detachable rim. Obviously, such a flood light could be used as automobile headlight.

Cyr U.S. Pat. No. 2,544,378 discloses a removable fog filter for automobile headlights. The filter is secured by rubber suction cups to the headlight with a substantial space between the headlight and the filter.

Kosmatka U.S. Pat. No. 4,006,377 discloses the application of colored lens covers or filters to sealed beam automobile headlights by use of a heat-shrinkable plastic ring which fastens and seals the filter to the headlight. This arrangement is for affixing the filter or lens cover permanently at the time of original manufacture.

SUMMARY OF THE INVENTION

It is an object of the invention to provide a new and improved removable lens cover or filter for automobile headlights.

Another object of this invention is to provide a removable lens cover or filter for automobile headlights which provides a tight peripheral seal at the point of attachment.

Other objects of this invention will become apparent from time to time throughout the specification and claims as hereinafter related.

This invention is particularly concerned with a new and improved lens cover or filter for automobile headlights which is amber or yellow in color, or other suitable fog-penetrating color, which can be removably secured to the headlight by the operator of the automobile whenever the need for a special fog light arises. Though particularly, the invention is concerned with a removable filter or lens cover for automobile headlights which is provided with a peripheral rim of a magnetic material which provides a continuous peripheral magnetic attachment to the rim of the headlight.

BRIEF DESCRIPTION OF THE DRAWINGS

FIG. 1 is a view in front elevation of an automobile.

FIG. 2 is a view and side elevation showing the attachment of a removable filter or lens cover, constituting one embodiment of this invention, to one of the headlights of the automobile.

FIG. 3 is a view of the lens cover or filter along the line 3—3 of FIG. 2.

FIG. 4 is a view in front elevation of an alternate embodiment of the lens cover or filter constituting this invention.

DESCRIPTION OF THE PREFERRED EMBODIMENTS

Referring now to the drawings, and more particularly to FIG. 1, there is shown an automobile generally designated 10 which is not any particular automobile but used only to illustrate the use of this invention. The automobile is provided with a plurality of headlights 11 of the sealed-beam type. The automobile shown is a modern automobile having twin headlights on each side. One set of headlights provides a low beam and the other set of headlights provides a high beam.

The automobile is provided with a set of removable lens covers or filters 12 which are preferably amber or yellow in color for use in rain or mist or fog. The removable lens covers or filters consist of a central portion 14 which is a concave disk of suitable plastic material which is transparent and colored amber or yellow or other suitable color providing the desired colored light for operation in fog or rain. The colored plastic disk 13 is preferably provided with ridges or corrugations, as shown, for purposes of mechanical strength and also functioning as a lens focusing the colored light projected into the fog or rain. The periphery of the disk 13 is secured in a peripheral rim 14 which is of a magnetic material. The rim 14 extends continuously around the filter or lens cover and is a continuous magnet or has a continuous magnetic material secured therein. The magnet may have a continuous pole at its outer edge and a continuous pole of the opposite polarity at its inner edge. Alternatively, the rim 14 may have a plurality of individual magnets secured therein and spaced around the entire periphery of the rim to provide a continuously applied magnetic force.

In FIG. 2, the lens cover or filter is shown installed against one of the headlights 11 of the automobile 10. The headlight 11, as previously described, is a conventional sealed-beam headlight and is secured in place by a metal rim 15 which is of chrome plated steel. The retaining rims for virtually all automobile headlights are of chrome plated steel and provide a magnetic base to which the magnetic rim 14 of the lens cover or filter 13 may be attached.

The magnetic rim 14 provides a tight continuous attachment of the lens cover or filter 13 to the rim 15 securing headlight 11 in place. This continuous attachment provides a seal which is tight against water, dust, and wind. It is particularly important that a continuous seal for the lens cover or filter be used to prevent the cover or filter from being blown off by the motion of air passed the headlights when the automobile is in motion at high speed.

In FIG. 4, there is shown an alternate embodiment of the lens cover or filter for use with headlights wherein the high beam and low beam are both within a single sealed beam lamp. In this embodiment the lens cover or filter 16 has a peripheral rim 17 containing a continuous magnet as described in connection with the embodiment shown in FIGS. 2 and 3. The magnet extends around the entire periphery of the lens cover or filter 16. The central portion of the lens cover or filter 16, however, is divided into two portions. The upper portion 18 is amber or yellow in color and the lower portion 19 is of clear uncolored plastic. This lens cover or filter may be installed over single headlights where the high beam and the low beam filaments are in a single lamp. It is installed with the amber or yellow portion at the top so that when the automobile is operated on a low beam there is no interference with the light which is projected out through the lower half of the lens cover or filter 16. When the headlight is operated on the high beam, the high beam of light passes out through the amber or yellow colored portion 18 of the lens cover or filter 16 and provides the desired colored light for operation in fog or rain.

The lens cover or filter, as described above, may be stored in the glove compartment or other convenient location in the automobile. These lens covers or filters may be applied whenever needed for use in rain or fog and are not intended for permanent installation. It is thus possible to operate the headlights normally when the lens covers or filters are not in use and to install the lens covers or filters on short notice whenever conditions of rain or fog are encountered. The fog filter may be used with headlights of any shape, viz. circular, oval, rectangular, square, etc. It should be noted particularly that each of the embodiments of the invention contemplates the use of the amber or yellow lens cover or filter to provide the amber or yellow color on the high beam of the automobile headlight while permitting the automobile to operate on low beam with no filter interfering with the intensity of the light.

I claim:

1. The combination with automobile headlights of the sealed-beam type, having a low beam filament and a high beam filament, of a removable light filter having at least a portion of amber or yellow color, said filter being positioned so that the colored portion covers only the high beam filament portion, and said filter having a continuous peripheral rim of magnetic material cooperable with the rim of the headlight on which it is fitted to provide a tight continuous seal, said combination being effective to project a beam of white light on low beam setting and a beam of amber of yellow light on high beam setting.

2. The combination according to claim 1 in which said filter is of clear plastic material having at least the portion covering the high beam portion of the headlights made of amber or yellow colored material, and said rim portion is of a size accurately fitting the retaining rim for the headlight.

3. The combination according to claim 2 in which said automobile headlights are of the twin headlight type and said filter is fitted over the high beam headlight having the low beam headlight unobstructed.

4. The combination according to claim 2 in which said automobile headlights are of the single beam type having a high beam filament and a low beam filament in the same headlight, and said filter is approximately half clear and half amber or yellow colored and is fitted over said headlight with the clear portion in front of the low beam filament and the colored portion in front of the high beam filament.

5. The combination according to claim 2 in which said rim of said filter contains a single continuous magnet therein.

6. The combination according to claim 2 in which said rim of said filter contains a plurality of closely spaced magnets.

* * * * *